US012100859B2

(12) United States Patent
Ohm et al.

(10) Patent No.: US 12,100,859 B2
(45) Date of Patent: Sep. 24, 2024

(54) REDUCED SHUTDOWN TEMPERATURE MEMBRANE INCLUDING HDPE PARTICLES AND SHUTDOWN REDUCING ADDITIVE AND POLYMER COMPOSITION FOR MAKING THE SAME

(71) Applicant: Celanese International Corporation, Irving, TX (US)

(72) Inventors: Christian Ohm, Gernsheim (DE); Kirsten Markgraf, Weinheim (DE)

(73) Assignee: Celanese International Corporation, Irving, TX (US)

( * ) Notice: Subject to any disclaimer, the term of this patent is extended or adjusted under 35 U.S.C. 154(b) by 254 days.

(21) Appl. No.: 17/245,255

(22) Filed: Apr. 30, 2021

(65) Prior Publication Data
US 2021/0351476 A1   Nov. 11, 2021

Related U.S. Application Data

(60) Provisional application No. 63/107,072, filed on Oct. 29, 2020, provisional application No. 63/018,924, filed on May 1, 2020.

(51) Int. Cl.
*H01M 50/417* (2021.01)
*B29C 48/00* (2019.01)
(Continued)

(52) U.S. Cl.
CPC .............. *H01M 50/417* (2021.01); *C08J 9/28* (2013.01); *C08L 23/06* (2013.01);
(Continued)

(58) Field of Classification Search
CPC ............ H01M 50/417; H01M 50/406; H01M 50/451; H01M 50/0525; H01M 10/0525; C08J 9/28; C08L 23/06
(Continued)

(56) References Cited

U.S. PATENT DOCUMENTS 5,683,634 A    11/1997  Fujii et al.
5,922,492 A *   7/1999  Takita ................... B32B 27/12
                                                            429/129
(Continued)

FOREIGN PATENT DOCUMENTS

CN          1428369 A      7/2003
CN        100420711 C      9/2008
(Continued)

OTHER PUBLICATIONS

International Search Report and The Written Opinion of the International Searching Authority, or the Declaration Corresponding to Application No. PCT/US21/30095 on Aug. 10, 2021.
(Continued)

*Primary Examiner* — Sean P Cullen
(74) *Attorney, Agent, or Firm* — DORITY & MANNING, P.A.

(57) ABSTRACT

A polymer composition for producing gel extruded articles is described. The polymer composition contains polyethylene particles combined with a plasticizer and one or more shutdown reducing additives. The shutdown reducing additives decrease the shutdown temperature of polymer articles made from the polymer composition. In one embodiment, the polymer composition is used to form a porous membrane for use of a battery separator.

21 Claims, 2 Drawing Sheets

(51) Int. Cl.
  *B29K 23/00* (2006.01)
  *B29K 105/00* (2006.01)
  *C08J 9/28* (2006.01)
  *C08L 23/06* (2006.01)
  *H01M 10/0525* (2010.01)
  *H01M 50/406* (2021.01)
  *H01M 50/451* (2021.01)

(52) U.S. Cl.
  CPC ..... *H01M 10/0525* (2013.01); *H01M 50/406* (2021.01); *H01M 50/451* (2021.01); *B29C 48/022* (2019.02); *B29K 2023/0633* (2013.01); *B29K 2105/0038* (2013.01); *C08J 2201/0502* (2013.01); *C08L 2201/52* (2013.01); *C08L 2205/025* (2013.01); *C08L 2205/06* (2013.01); *C08L 2207/062* (2013.01); *C08L 2207/066* (2013.01)

(58) Field of Classification Search
  USPC ........................................ 429/144, 251, 254
  See application file for complete search history.

(56) References Cited

U.S. PATENT DOCUMENTS

| | | | |
|---|---|---|---|
| 6,054,498 A | 4/2000 | Hasegawa et al. | |
| 6,168,858 B1 * | 1/2001 | Hasegawa | H01M 50/417 429/62 |
| 6,180,280 B1 | 1/2001 | Spotnitz | |
| 6,666,969 B1 * | 12/2003 | Funaoka | H01M 50/491 210/500.36 |
| 6,692,867 B2 | 2/2004 | Nark et al. | |
| 6,749,961 B1 | 6/2004 | Nguyen et al. | |
| 7,238,744 B2 | 7/2007 | Yaritz et al. | |
| 7,498,369 B2 | 3/2009 | Whear et al. | |
| 7,705,075 B2 | 4/2010 | Kumar et al. | |
| 8,008,423 B2 | 8/2011 | Kumar et al. | |
| 8,252,884 B2 | 8/2012 | Kumar et al. | |
| 8,481,670 B2 | 7/2013 | Kumar et al. | |
| 10,208,143 B2 | 2/2019 | Best et al. | |
| 2007/0221567 A1 | 9/2007 | Simmons et al. | |
| 2013/0256933 A1 | 10/2013 | Takita et al. | |
| 2014/0057057 A1 | 2/2014 | Terai et al. | |
| 2014/0295245 A1 * | 10/2014 | Miyazaki | H01M 50/489 429/246 |
| 2014/0309351 A1 | 10/2014 | Lightbody et al. | |
| 2018/0166670 A1 | 6/2018 | Toyota et al. | |
| 2019/0055385 A1 | 2/2019 | Ohm et al. | |
| 2019/0292332 A1 | 9/2019 | Ohm et al. | |

FOREIGN PATENT DOCUMENTS

| | | | | |
|---|---|---|---|---|
| CN | 102558644 B | | 7/2012 | |
| CN | 101469087 B | | 8/2013 | |
| CN | 102558645 B | | 10/2013 | |
| CN | 102558646 B | | 10/2013 | |
| CN | 105255201 A | | 1/2016 | |
| CN | 105367880 A | | 3/2016 | |
| CN | 104292574 B | | 8/2016 | |
| CN | 105885154 A | | 8/2016 | |
| CN | 106207220 A | | 12/2016 | |
| CN | 106252563 A | | 12/2016 | |
| CN | 106299205 A | | 1/2017 | |
| CN | 106554553 A | | 4/2017 | |
| CN | 206163584 U | | 5/2017 | |
| CN | 106848403 A | | 6/2017 | |
| CN | 108550769 A | | 9/2018 | |
| CN | 109473602 A | * | 3/2019 | .......... H01M 10/052 |
| EP | 2111915 A1 | * | 10/2009 | ......... B01D 67/0027 |
| JP | H06212006 A | | 8/1994 | |
| JP | 2001138455 A | | 5/2001 | |
| JP | 2001200082 A | | 7/2001 | |
| JP | 2003217554 A | | 7/2003 | |
| JP | 2003323878 A | | 11/2003 | |
| JP | 2004152614 A | | 5/2004 | |
| JP | 2005343933 A | * | 12/2005 | |
| JP | 2006016550 A | * | 1/2006 | |
| JP | 2010244874 A | | 10/2010 | |
| JP | 2011116934 A | * | 6/2011 | |
| JP | 2013057045 A | | 3/2013 | |
| JP | 2017088836 A | | 5/2017 | |
| JP | 2017088837 A | | 5/2017 | |
| JP | 6487591 B1 | | 3/2019 | |
| KR | 20020055522 A | | 7/2002 | |
| KR | 100814984 B1 | | 3/2008 | |
| WO | WO2007/116257 | | 10/2007 | |
| WO | WO2020036451 A1 | | 2/2020 | |

OTHER PUBLICATIONS

European Search Report Corresponding to Application No. 21797222.3 on Apr. 15, 2024.
Chen et al., Influence of cocrystallization behavior on structure and properties of HDPE/LLDPE microporous membrane, Journal of Polymer Research, vol. 23, No. 3, 2016, 9 pages.

* cited by examiner

REDUCED SHUTDOWN TEMPERATURE MEMBRANE INCLUDING HDPE PARTICLES AND SHUTDOWN REDUCING ADDITIVE AND POLYMER COMPOSITION FOR MAKING THE SAME

RELATED APPLICATIONS

The present application is based upon and claims priority to U.S. Provisional Patent Application Ser. No. 63/018,924, having a filing date of May 1, 2020 and U.S. Provisional Patent Application Ser. No. 63/107,072, having a filing date of Oct. 29, 2020, both of which are incorporated herein by reference.

BACKGROUND

Polyethylene polymers have numerous and diverse uses and applications. For example, high density polyethylenes are valuable engineering plastics, with a unique combination of abrasion resistance, surface lubricity, chemical resistance and impact strength. They find application in the production of high strength fibers for use in ropes and anti-ballistic shaped articles and in the production of other elongated articles, such as membranes for electronic devices. However, since the flowability of these materials in the molten state decreases as the molecular weight increases, processing by conventional techniques, such as melt extrusion, is not always possible.

One alternative method for producing fibers and other elongated components from polyethylene polymers is by gel-processing in which the polymer is combined with a solvent. The resultant gel is extruded into a fiber or membrane, and may be stretched in one or two directions. Also, part or all of the solvent may be removed from the product.

Membranes made from polyethylene polymers through gel-processing can be formed to have many beneficial properties. For instance, the membranes can be formed with micro-pores. Microporous polyethylene membranes formed through gel-processing, for instance, are particularly well suited for use as a separator in a battery, such as a lithium ion battery. The microporous membrane, for instance, can separate an anode from a cathode and prevent a short circuit between the active battery components. At the same time, the microporous membrane permits ions to pass through due to the porous nature of the material. The ion permeability characteristics of the microporous polyethylene membrane makes the material particularly well suited for regulating electrochemical reactions within the battery.

In addition to the microporous nature of the polyethylene membrane and to possessing beneficial strength and other physical properties, the polyethylene membranes also offer what is referred to in the art as having an effective "shutdown effect". The shutdown effect refers to the self-closing of micro-pores within the polyethylene separator when it surpasses a certain temperature. When the pores in the polyethylene membrane are closed upon reaching a certain temperature, ions can no longer pass through the membrane and the electrochemical function of the battery stops. This effect becomes an important safety feature for the battery as it prevents thermal runaway reactions from continuing and prevents the battery from overheating and creating a potentially hazardous situation.

Although microporous membranes made from high molecular weight polyethylene polymers inherently possess lower shutdown temperatures than many other materials, there is a desire in the art for the polyethylene membranes to have an even lower shutdown temperature without compromising physical properties. In fact, even small decreases in the shutdown temperature of the material can offer dramatic improvements in safety and other functions of the battery. Unfortunately, when efforts are undertaken to reduce the shutdown temperature, other properties of the membrane can be adversely affected. Thus, a need exists for a method and technique of lowering the shutdown temperature of polyethylene membranes without adversely impacting other properties of the material.

SUMMARY

In general, the present disclosure is directed to polyolefin compositions well suited for gel-processing applications. More particularly, the present disclosure is directed to a polymer composition containing a high density polyethylene polymer well suited for producing microporous, ion permeable membranes that may be used as separators in batteries. In accordance with the present disclosure, the polymer composition is formulated so as to have a lower shutdown temperature so that the membrane becomes substantially impermeable once the membrane is subjected to higher temperatures in a particular environment. For instance, when used as a battery separator, the shutdown temperature of the membrane can prevent the battery from a thermal runaway condition.

In one embodiment, the present disclosure is directed to a polymer composition for producing gel extruded articles. The polymer composition comprises a plasticizer, high density polyethylene particles and a shutdown reducing additive. The shutdown reducing additive comprises particles that are combined with the high density polyethylene particles and the plasticizer.

In one embodiment, the shutdown reducing additive reduces the shutdown temperature such that the shutdown temperature is at least about 1.4° C. lower, such as at least about 1.8° C. lower, such as at least about 2.2° C. lower, such as at least about 2.5° C. lower than a polymer composition where the shutdown reducing additive is replaced by further amounts of the polyethylene particles. In other aspects, the shutdown reducing additive reduces the shutdown temperature of the polymer composition by greater than about 3° C., such as by greater than about 4° C., such as greater than about 5° C., such as greater than about 6° C., such as greater than about 7° C. The shutdown reducing temperature of the polymer composition is generally reduced by no more than about 20° C., such as by no more than about 15° C., such as by no more than about 10° C.

The shutdown reducing additive may comprise a different high density polyethylene in relation to the primary high density polyethylene particles present in the composition, a low density polyethylene, a linear low density polyethylene, a metallocene catalyzed linear low density polyethylene, a polyethylene wax, a hydrogenated fatty acid, an amide of a fatty acid, a middle density polyethylene, a dimer of a fatty acid, a plastomer, an elastomer, or mixtures thereof. In one embodiment, the shutdown reducing additive is a polyethylene polymer having a melt flow rate of from about 0.01 g/10 min to about 70 g/10 min, such as from about 0.05 g/10 min to about 50 g/10 min, such as from about 0.1 g/10 min to about 30 g/10 min, such as from about 1 g/10 min to about 20 g/10 min. The shutdown reducing additive can be present in the polymer composition in an amount from about 10% to about 40% by weight, such as in an amount from about 15% to about 35% by weight, such as in an amount from about 20% to about 30% by weight.

The high density polyethylene particles can, in one embodiment, have a median particle size by volume of less than about 150 microns, such as less than about 125 microns, and generally greater than about 50 microns. The shutdown reducing additive, on the other hand, can be in the form of particles having a median particle size by volume of less than about 800 microns, such as less than about 600 microns, such as less than about 400 microns, such as less than about 200 microns, and generally greater than about 25 microns, such as greater than about 50 microns.

In general, the polymer composition contains the high density polyethylene resin in an amount up to about 50% by weight, such as from about 0.5% to about 15% by weight, such as from about 2% to about 8% by weight. The plasticizer, for instance, can be present in the composition in an amount greater than about 50% by weight, such as in an amount greater than about 60% by weight, such as in an amount greater than about 70% by weight, such as in an amount greater than about 80% by weight, such as in an amount less than about 90% by weight. Various different materials can be used as the plasticizer. For instance, the plasticizer may comprise a mineral oil, a paraffinic oil, a hydrocarbon oil, an alcohol, or the like. For instance, the plasticizer may comprise decaline, xylene, dioctyl phthalate, dibutyl phthalate, stearyl alcohol, oleyl alcohol, decyl alcohol, nonyl alcohol, diphenyl ether, n-decane, n-dodecane, or mixtures thereof. In one embodiment, the plasticizer may comprise a C5-C12 hydrocarbon, such as a C5-C12 saturated hydrocarbon. For example, the plasticizer may comprise heptane, hexane, a paraffin, or the like.

In one embodiment, the high density polyethylene used to produce the particles can have a relatively high molecular weight. The use of higher molecular weight polyethylene particles may be beneficial, especially in applications where greater strength properties are needed or desired. For example, the polyethylene used to produce the particles can have a molecular weight of greater than about 500,000 g/mol, such as greater than about 700,000 g/mol, such as greater than about 1,000,000 g/mol, such as greater than about 1,500,000 g/mol, and less than about 4,000,000 g/mol, such as less than about 3,500,000 g/mol. In one embodiment, the polyethylene used to produce the particles comprises a Ziegler-Natta catalyzed high molecular weight polyethylene.

The present disclosure is also directed to polymer articles formed from the above polymer composition. The polymer articles can be produced through a gel extrusion or gel-spinning process. Polymer articles made in accordance with the present disclosure include fibers, films, such as membranes, or the like.

During the formation of polymer articles, a significant portion of the plasticizer is removed. For example, in one aspect, greater than 95% by weight, such as greater than about 98% by weight of the plasticizer is removed in forming the polymer article. Consequently, polymer articles made in accordance with the present disclosure generally contain the high density polyethylene combined with the shutdown reducing additive. For example, the resulting polymer article can contain the high density polyethylene polymer in an amount from about 60% to about 98% by weight, such as in an amount from about 65% by weight to about 97% by weight. The shutdown reducing additive can be present in the polymer article in an amount from about 2% by weight to about 40% by weight, such as from about 3% by weight to about 35% by weight, such as in an amount from about 4% to about 10% by weight.

The present disclosure is also directed to a process for producing polymer articles. The process includes the steps of forming a gel-like composition from the polymer composition described above. The gel-like composition is then extruded through a die to form a polymer article. The polymer article, for instance, may comprise fibers, a continuous film, or a discontinuous film, such as a porous membrane. During formation of the polymer article, at least part of the plasticizer is separated and removed from the polyethylene article. For instance, in one embodiment, greater than 80%, such as greater than 90%, such as greater than 95%, such as greater than 98% of the plasticizer is removed during formation of the polymer article.

In one embodiment, an extraction solvent, such as dichloromethane is combined with the polymer composition before or during formation of the polymer article. The extraction solvent can be used to facilitate removal of the plasticizer.

Other features and aspects of the present disclosure are discussed in greater detail below.

BRIEF DESCRIPTION OF THE DRAWINGS

The present disclosure may be better understood with reference to the following figures.

Figure 1:
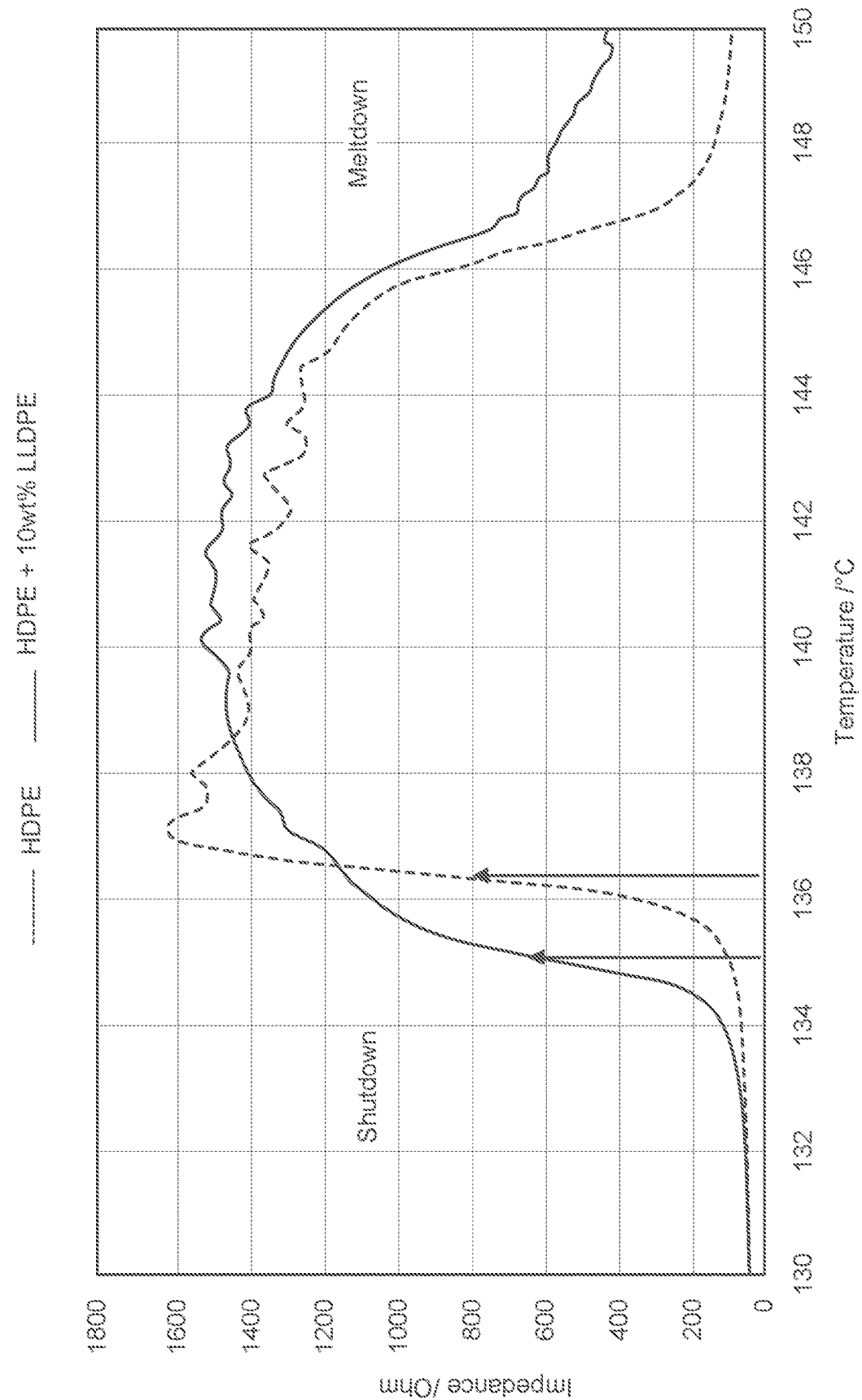
FIG. 1 is a plot or graph illustrating the shutdown temperature of a microporous membrane using an Impedance Test.

Repeat use of reference characters in the present specification and drawings is intended to represent the same or analogous features or elements of the present invention.

Definitions

The shutdown temperature of a polymer article, such as a microporous membrane, can vary depending upon the type of test and instrument used to measure the shutdown temperature. In fact, the shutdown temperature can vary widely depending upon the procedure, molecular weight of the base resin, and equipment used to make the determination. Thus, any reported shutdown temperatures for various products can be much lower than if a different test or technique is used.

In the present disclosure, the shutdown temperature of a polymer article, such as a porous membrane or of a polymer composition can be determined according to the "Impedance Test," the "Thermomechanical Analysis Test," and the "Differential Scanning Calorimetry Test. The Impedance Test, however, is the only test that directly measures shutdown temperature. The following tests are defined as follows.

Impedance Test

The impedance spectroscopy test setup consists of a glass measurement cell containing two steel electrodes. According to the impedance spectroscopy method, the sample is soaked in an electrolyte (1M $LiPF_6$ in 1:1 ethylene carbonate/dimethyl carbonate) and assembled into the cell between the electrodes. The measurement cell is then connected to an impedance spectrometer that records impedance spectrum every 50 seconds at a frequency between 100 Hz and 100 kHz. The measurement cell is then placed in an oven and heated over 2 hours from 110° C. to 150° C. while continuously recording impedance spectra. Data evaluation is done with a plot of impedance versus temperature and shutdown temperature is indicated by midway of a steep increase in impedance. An example plot is demonstrated in FIG. 1 in which the arrows indicate shutdown temperature. The test can be conducted using an HCP-803 potentiostat available from Biologic Science Instruments.

Thermo Mechanical Analysis (TMA Test)

Under the TMA method, the dynamic strain is measured while the sample is subjected to a temperature regime and a static force of 0.2N with a force multiplier of 0.5. The test is performed over a temperature range from room temperature (25-30° C.) to 160° C. with a heating rate of 2° C./min. The frequency is set at 0.1 Hz. Data evaluation is done with a plot of dynamic strain versus temperature and the softening point is indicated by the dynamic strain inflection point. The test can be conducted on a Perkin Elmer DMA 8000 dynamic mechanical analyzer.

Differential Scanning Calorimetry (DSC Test)

Using differential scanning calorimetry (DSC), the melting point of the sample can be determined by ISO Test No. 11357 under the following conditions: The sample is heated from 0° C. to 180° C. with a heating rate of 10° C./min and held isothermally for 5 min at 180° C. After the isothermal hold, the sample is cooled to 0° C. with a heating rate of 10° C./min. Finally, the sample is heated to 180° C. with a heating rate of 20° C. The sample is inerted with nitrogen during all steps of the DSC procedure. The test can be conducted using a DSC Q2000 calorimeter available from TA Instruments.

As used herein, puncture strength is measured according to ASTM Test D3763 and measures the ability of a membrane to withstand a foreign particle from causing a hole or defect. The test is conducted on a testing device, such as an Instron CEAST 9340 device. The drop height is 0.03 to 1.10 m. The impact velocity is 0.77 to 4.65 m/s. The maximum dropping mass is 37.5 kg and the maximum potential energy is 405 J. Puncture strength is measured in slow speed puncture mode at 1.67 mm/s.

The melt flow rate of a polymer or polymer composition is measured according to ISO Test 1133 at 190° C. and at a load of 2.16 kg (unless otherwise indicated).

The density of a polymer is measured according to ISO Test 1183 in units of g/cm$^3$.

Average particle size (d50) is measured using laser diffraction/light scattering, such as a suitable Horiba light scattering device.

The average molecular weight of a polymer is determined using the Margolies' equation.

Tensile modulus, tensile stress at yield, tensile strain at yield, tensile stress at 50% break, tensile stress at break, and tensile nominal strain at break are all measured according to ISO Test 527-2/1B.

Gurley permeability can be measured according to the Gurley Test, using a Gurley permeability tester, such as Gurley Densometer, Model KRK 2060c commercially available from Kumagai Riki Kogyo Co., LTD. The test is conducted according to ISO Test 5636. The Gurley Test measures air permeability as a function of the time required for a specified amount of air to pass through a specified area under a specified pressure. The units are reported in sec/100 ml.

Porosity (%) is measured according to the following procedure. During the procedure, the following ASTM Standards are used as a reference: D622 Standard Test Method for Apparent Density of Rigid Cellular Plastics1; and D729 Standard Test Methods for Density and Specific Gravity (Relative Density) of Plastics by Displacement1. The following instruments are used: Calibrated Analytical Balance (0.0001 grams); Lorentzen&Wettre Micrometer, code 251 (0.1 um); and Deli 2056 art knife.

Procedure:

1.1. Samples and Sample Preparation

Using the specimen art knife, cut each sample material into a minimum of three 60 mm±0.5 by 60 mm±0.5 specimens 1.2. Instrument and Measurement 3.2.1 Using the L&W micrometer, take five readings of the thickness at each 60 mm by 60 mm specimen (average of 5 readings). Record this value as the thickness of this specimen.

3.2.2 Weigh the specimen directly on the balance. Record this value as the weight of this specimen.

3.2.3 The three specimens of the same sample are placed together and steps 2.2.1 and 3.2.2 are repeated to obtain the [bulk] thickness and the [bulk] weight.

Calculate the Density to Three Significant Figures as Follows a. $D\text{film} = \text{Density(film)} = \text{Wt. of Specimen} / \text{THK} * \text{Square}$ Dfilm=density of specimen, mg/mm3
Wt=weight of specimen, mg
THK=thickness of specimen, mm
Square=area of specimen, (mm2)

b. $D\text{polymer} = \text{Density(polymer)}\ 0.95\ (g/cm3)$

Dpolymer: Density of raw materials, without the pores.

c. $\text{Porosity} = (1 - D\text{film}/D\text{polymer}) * 100\%$

DETAILED DESCRIPTION

It is to be understood by one of ordinary skill in the art that the present discussion is a description of exemplary embodiments only, and is not intended as limiting the broader aspects of the present disclosure.

In general, the present disclosure is directed to a polymer composition well suited for producing gel extruded articles, such as fibers and films, including porous membranes. The polymer composition contains a polyethylene resin, such as high density polyethylene particles, combined with a plasticizer and a shutdown reducing additive. In accordance with the present disclosure, the shutdown reducing additive comprises particles that are combined with the high density polyethylene particles and, when the composition is formed into a porous membrane, reduces the shutdown temperature of the membrane. Of particular advantage, the shutdown reducing additive can be incorporated into the polymer composition in relatively great amounts without comprising the physical or mechanical properties of articles made from the composition. Thus, a shutdown reducing additive can be incorporated into the polymer composition of the present disclosure without substantially effecting the mechanical properties of a membrane made from the composition.

In general, any suitable high density polyethylene polymer may be used to form the primary polymer component and the matrix polymer of the polymer composition. The high density polyethylene has a density of about 0.93 g/cm$^3$ or greater, such as about 0.94 g/cm$^3$ or greater, such as about 0.95 g/cm$^3$ or greater, and generally less than about 1 g/cm$^3$.

The high density polyethylene polymer can be made from over 90% ethylene derived units, such as greater than 95% ethylene derived units, or from 100% ethylene derived units. The polyethylene can be a homopolymer or a copolymer, including a terpolymer, having other monomeric units.

The high density polyethylene can be a high molecular weight polyethylene, a very high molecular weight polyethylene, and/or an ultrahigh molecular weight polyethylene. "High molecular weight polyethylene" refers to polyethylene compositions with an average molecular weight of at least about $3 \times 10^5$ g/mol and, as used herein, is intended to include very-high molecular weight polyethylene and ultra-high molecular weight polyethylene. For purposes of the present specification, the molecular weights referenced herein are determined in accordance with the Margolies equation ("Margolies molecular weight").

"Very-high molecular weight polyethylene" refers to polyethylene compositions with a weight average molecular weight of less than about $3 \times 10^6$ g/mol and more than about $1 \times 10^6$ g/mol. In some embodiments, the molecular weight of the very-high molecular weight polyethylene composition is between about $2 \times 10^6$ g/mol and less than about $3 \times 10^6$ g/mol.

"Ultra-high molecular weight polyethylene" refers to polyethylene compositions with an average molecular weight of at least about $3 \times 10^6$ g/mol. In some embodiments, the molecular weight of the ultra-high molecular weight polyethylene composition is between about $3 \times 10^6$ g/mol and about $30 \times 10^6$ g/mol, or between about $3 \times 10^6$ g/mol and about $20 \times 10^6$ g/mol, or between about $3 \times 10^6$ g/mol and about $10 \times 10^6$ g/mol, or between about $3 \times 10^6$ g/mol and about $6 \times 10^6$ g/mol.

In one aspect, the high density polyethylene is a homopolymer of ethylene. In another embodiment, the high density polyethylene may be a copolymer. For instance, the high density polyethylene may be a copolymer of ethylene and another olefin containing from 3 to 16 carbon atoms, such as from 3 to 10 carbon atoms, such as from 3 to 8 carbon atoms. These other olefins include, but are not limited to, propylene, 1-butene, 1-pentene, 1-hexene, 1-heptene, 1-octene, 4-methylpent-1-ene, 1-decene, 1-dodecene, 1-hexadecene and the like. Also utilizable herein are polyene comonomers such as 1,3-hexadiene, 1,4-hexadiene, cyclopentadiene, dicyclopentadiene, 4-vinylcyclohex-1-ene, 1,5-cyclooctadiene, 5-vinylidene-2-norbornene and 5-vinyl-2-norbornene. However, when present, the amount of the non-ethylene monomer(s) in the copolymer may be less than about 10 mol. %, such as less than about 5 mol. %, such as less than about 2.5 mol. %, such as less than about 1 mol. %, wherein the mol. % is based on the total moles of monomer in the polymer.

In one embodiment, the high density polyethylene may have a monomodal molecular weight distribution. Alternatively, the high density polyethylene may exhibit a bimodal molecular weight distribution. For instance, a bimodal distribution generally refers to a polymer having a distinct higher molecular weight and a distinct lower molecular weight (e.g. two distinct peaks) on a size exclusion chromatography or gel permeation chromatography curve. In another embodiment, the high density polyethylene may exhibit more than two molecular weight distribution peaks such that the polyethylene exhibits a multimodal (e.g., trimodal, tetramodal, etc.) distribution. Alternatively, the high density polyethylene may exhibit a broad molecular weight distribution wherein the polyethylene is comprised of a blend of higher and lower molecular weight components such that the size exclusion chromatography or gel permeation chromatography curve does not exhibit at least two distinct peaks but instead exhibits one distinct peak broader than the individual component peaks.

Any method known in the art can be utilized to synthesize the polyethylene. The polyethylene powder is typically produced by the catalytic polymerization of ethylene monomer or optionally with one or more other 1-olefin co-monomers, the 1-olefin content in the final polymer being less or equal to 10% of the ethylene content, with a heterogeneous catalyst and an organo aluminum or magnesium compound as cocatalyst. The ethylene is usually polymerized in gaseous phase or slurry phase at relatively low temperatures and pressures. The polymerization reaction may be carried out at a temperature of between 50° C. and 100° C. and pressures in the range of 0.02 and 2 MPa.

The molecular weight of the polyethylene can be adjusted by adding hydrogen. Altering the temperature and/or the type and concentration of the co-catalyst may also be used to fine tune the molecular weight. Additionally, the reaction may occur in the presence of antistatic agents to avoid fouling and product contamination.

Suitable catalyst systems include but are not limited to Ziegler-Natta type catalysts. Typically Ziegler-Natta type catalysts are derived by a combination of transition metal compounds of Groups 4 to 8 of the Periodic Table and alkyl or hydride derivatives of metals from Groups 1 to 3 of the Periodic Table. Transition metal derivatives used usually comprise the metal halides or esters or combinations thereof. Exemplary Ziegler-Natta catalysts include those based on the reaction products of organo aluminum or magnesium compounds, such as for example but not limited to aluminum or magnesium alkyls and titanium, vanadium or chromium halides or esters. The heterogeneous catalyst might be either unsupported or supported on porous fine grained materials, such as silica or magnesium chloride. Such support can be added during synthesis of the catalyst or may be obtained as a chemical reaction product of the catalyst synthesis itself.

In one embodiment, a suitable catalyst system can be obtained by the reaction of a titanium(IV) compound with a trialkyl aluminum compound in an inert organic solvent at temperatures in the range of −40° C. to 100° C., preferably −20° C. to 50° C. The concentrations of the starting materials are in the range of 0.1 to 9 mol/L, preferably 0.2 to 5 mol/L, for the titanium(IV) compound and in the range of 0.01 to 1 mol/L, preferably 0.02 to 0.2 mol/L for the trialkyl aluminum compound. The titanium component is added to the aluminum component over a period of 0.1 min to 60 min, preferably 1 min to 30 min, the molar ratio of titanium and aluminum in the final mixture being in the range of 1:0.01 to 1:4.

In another embodiment, a suitable catalyst system is obtained by a one or two-step reaction of a titanium(IV) compound with a trialkyl aluminum compound in an inert organic solvent at temperatures in the range of −40° C. to 200° C., preferably −20° C. to 150° C. In the first step the titanium(IV) compound is reacted with the trialkyl aluminum compound at temperatures in the range of −40° C. to 100° C., preferably −20° C. to 50° C. using a molar ratio of titanium to aluminum in the range of 1:0.1 to 1:0.8. The concentrations of the starting materials are in the range of 0.1 to 9.1 mol/L, preferably 5 to 9.1 mol/L, for the titanium (IV) compound and in the range of 0.05 and 1 mol/L, preferably 0.1 to 0.9 mol/L for the trialkyl aluminum compound. The titanium component is added to the aluminum compound over a period of 0.1 min to 800 min, preferably 30 min to 600 min. In a second step, if applied, the reaction product obtained in the first step is treated with a trialkyl aluminum compound at temperatures in the range of −10° C. to 150° C., preferably 10° C. to 130° C. using a molar ratio of titanium to aluminum in the range of 1:0.01 to 1:5.

In yet another embodiment, a suitable catalyst system is obtained by a procedure wherein, in a first reaction stage, a magnesium alcoholate is reacted with a titanium chloride in an inert hydrocarbon at a temperature of 50° to 100° C. In a second reaction stage the reaction mixture formed is subjected to heat treatment for a period of about 10 to 100 hours at a temperature of 110° to 200° C. accompanied by evolution of alkyl chloride until no further alkyl chloride is evolved, and the solid is then freed from soluble reaction products by washing several times with a hydrocarbon.

In a further embodiment, catalysts supported on silica, such as for example the commercially available catalyst system Sylopol 5917 can also be used.

Using such catalyst systems, the polymerization is normally carried out in suspension at low pressure and temperature in one or multiple steps, continuous or batch. The polymerization temperature is typically in the range of 30° C. to 130° C., preferably is the range of 50° C. and 90° C. and the ethylene partial pressure is typically less than 10 MPa, preferably 0.05 and 5 MPa. Trialkyl aluminums, like for example but not limited to isoprenyl aluminum and triisobutyl aluminum, are used as co-catalyst such that the ratio of Al:Ti (co-catalyst versus catalyst) is in the range of 0.01 to 100:1, more preferably is the range of 0.03 to 50:1. The solvent is an inert organic solvent as typically used for Ziegler type polymerizations. Examples are butane, pentane, hexane, cyclohexene, octane, nonane, decane, their isomers and mixtures thereof. The polymer molecular mass is controlled through feeding hydrogen. The ratio of hydrogen partial pressure to ethylene partial pressure is in the range of 0 to 50, preferably the range of 0 to 10. The polymer is isolated and dried in a fluidized bed drier under nitrogen. The solvent may be removed through steam distillation in case of using high boiling solvents. Salts of long chain fatty acids may be added as a stabilizer. Typical examples are calcium, magnesium and zinc stearate.

Optionally, other catalysts such as Phillips catalysts, metallocenes and post metallocenes may be employed. Generally a cocatalyst such as alumoxane or alkyl aluminum or alkyl magnesium compound is also employed. Other suitable catalyst systems include Group 4 metal complexes of phenolate ether ligands.

In accordance with the present disclosure, the high density polyethylene polymer is formed into particles and combined with a plasticizer. In one embodiment, the polyethylene particles are made from a polyethylene polymer having a relatively low bulk density as measured according to DIN53466. For instance, in one embodiment, the bulk density is generally less than about 0.4 g/cm$^3$, such as less than about 0.35 g/cm$^3$, such as less than about 0.33 g/cm$^3$, such as less than about 0.3 g/cm$^3$, such as less than about 0.28 g/cm$^3$, such as less than about 0.26 g/cm$^3$. The bulk density is generally greater than about 0.1 g/cm$^3$, such as greater than about 0.15 g/cm$^3$. In one embodiment, the polymer has a bulk density of from about 0.2 g/cm$^3$ to about 0.27 g/cm$^3$.

In one embodiment, the polyethylene particles can be a free-flowing powder. The particles can have a median particle size (d50) by volume of less than 200 microns. For example, the median particle size (d50) of the polyethylene particles can be less than about 150 microns, such as less than about 125 microns. The median particle size (d50) is generally greater than about 20 microns. The powder particle size can be measured utilizing a laser diffraction method according to ISO 13320.

In one embodiment, 90% of the polyethylene particles can have a particle size of less than about 250 microns. In other embodiments, 90% of the polyethylene particles can have a particle size of less than about 200 microns, such as less than about 170 microns.

The molecular weight of the polyethylene polymer can vary depending upon the particular application. The polyethylene polymer, for instance, may have an average molecular weight, as determined according to the Margolies equation. The molecular weight can be determined by first measuring the viscosity number according to DIN EN ISO Test 1628. Dry powder flow is measured using a 25 mm nozzle. The molecular weight is then calculated using the Margolies equation from the viscosity numbers. The average molecular weight is generally greater than about 300,000 g/mol, such as greater than about 500,000 g/mol, such as greater than about 700,000 g/mol, such as greater than about 1,000,000 g/mol, such as greater than about 2,000,000 g/mol, such as greater than about 2,500,000 g/mol, such as greater than about 3,000,000 g/mol, such as greater than about 4,000,000 g/mol. The average molecular weight is generally less than about 12,000,000 g/mol, such as less than about 10,000,000 g/mol. In one aspect, the number average molecular weight of the high density polyethylene polymer can be less than about 4,000,000 g/mol, such as less than about 3,000,000 g/mol.

The polyethylene may have a viscosity number of from at least 100 mL/g, such as at least 500 mL/g, such as at least 1,500 mL/g, such as at least 2,000 mL/g, such as at least 4,000 mL/g to less than about 6,000 mL/g, such as less than about 5,000 mL/g, such as less than about 4000 mL/g, such as less than about 3,000 mL/g, such as less than about 1,000 mL/g, as determined according to ISO 1628 part 3 utilizing a concentration in decahydronapthalene of 0.0002 g/mL.

The high density polyethylene may have a crystallinity of from at least about 40% to 85%, such as from 45% to 80%.

In general, the high density polyethylene particles are present in the polymer composition in an amount up to about 50% by weight. For instance, the high density polyethylene particles can be present in the polymer composition in an amount less than about 45% by weight, such as in an amount less than about 40% by weight, such as in an amount less than about 35% by weight, such as in an amount less than about 30% by weight, such as in an amount less than about 25% by weight, such as in an amount less than about 20% by weight, such as in an amount less than about 15% by weight. The polyethylene particles can be present in the composition in an amount greater than about 5% by weight, such as in an amount greater than about 10% by weight, such as in an amount greater than about 15% by weight, such as in an amount greater than about 20% by weight, such as in an amount greater than about 25% by weight. During gel processing, a plasticizer is combined with the high density polyethylene particles which can be substantially or completely removed in forming polymer articles. For example, in one embodiment, the resulting polymer article can contain the high density polyethylene polymer in an amount greater than about 70% by weight, such as in an amount greater than about 80% by weight, such as in an amount greater than about 85% by weight, such as in an amount greater than about 90% by weight, such as in an amount greater than about 95% by weight.

In accordance with the present disclosure, the polymer composition for producing gel extruded articles contains a shutdown reducing additive in combination with the high density polyethylene particles. The shutdown reducing additive can also be present in the form of particles that are mixed or blended with the high density polyethylene particles. Melt blending the high density polyethylene particles with the shutdown reducing additive, for instance, may produce adverse consequences such as polymer entanglements that can make it difficult to produce gel extruded articles from the polymer composition.

The shutdown reducing additive is combined with the high density polyethylene particles in a manner that reduces the shutdown temperature of the polymer composition when formed into an article, such as a porous membrane. The particular shutdown reducing additive selected for an application can depend upon various factors including the type of high density polyethylene particles that are combined with the shutdown reducing additive. In general, the shutdown reducing additive may comprise high density polyethylene particles that are different than the matrix polymer, low density polyethylene particles, linear low density polyethylene particles, metallocene linear low density polyethylene particles having a molecular weight distribution or polydispersity index of less than about 3, such as less than about 2.5, polyethylene wax particles, hydrogenated fatty acid particles, particles made from dimers of fatty acids, plastomer particles, elastomer particles, and mixtures thereof.

For example, in one aspect, the shutdown reducing additive can be made from a polyethylene polymer. For example, in one aspect, the polyethylene polymer can be a high density polyethylene polymer, that has a molecular weight that is less than the molecular weight of the high density polyethylene matrix polymer. For example, the high density polyethylene polymer can have an average molecular weight of less than about 700,000 g/mol, such as less than about 500,000 g/mol, such as less than about 300,000 g/mol, such as less than about 100,000 g/mol. The average molecular weight of the high density polyethylene polymer is generally greater than about 80,000 g/mol.

In still another aspect, the shutdown reducing additive can be a middle density polyethylene. A middle density polyethylene, for instance, can have a density generally of from about 0.92 g/cm$^3$ to about 0.94 g/cm$^3$.

In an alternative embodiment, the shutdown reducing additive can be a low density polyethylene. Low density polyethylene can have a branched structure, which differentiates the polymer from a high density polyethylene or a linear low density polyethylene. The polymer branching increases clarity, increases flexibility, and makes the polymer easy to melt process. The molecular weight, crystallinity and molecular weight distribution of low density polyethylene can be varied depending upon the particular application.

The degree of crystallinity of low density polyethylene can be a function of the amount of branching present on the polymer molecules. The crystallinity of the polymer, for instance, can generally be greater than about 20%, such as greater than about 30%, and generally less than about 50%, such as less than about 40%. The degree of crystallinity of low density polyethylene is generally less than the crystallinity of high density polyethylene, which can have crystallinity values of from about 50% to about 75%.

The low density polyethylene can generally have a narrow molecular distribution or a medium molecular weight distribution. For instance, in one aspect, the molecular weight distribution can be from about 3 to about 5. Alternatively, the molecular weight distribution can be from about 6 to about 12. Molecular weight distribution is defined as the ratio of the weight average molecular weight to the number average molecular weight.

The shutdown reducing additive can also be a linear low density polyethylene. Linear low density polyethylene polymer chains generally have no long chain branching. For instance, the polymer can be produced at lower temperatures than low density polyethylene. The linear low density polyethylene can be a polyethylene homopolymer or can be a copolymer of ethylene and higher alpha olefins, such as butene, hexene, or octene. In one aspect, the linear low density polyethylene can have a density of greater than about 0.9 g/cm$^3$, such as greater than about 0.91 g/cm$^3$, and generally less than about 0.93 g/cm$^3$, such as less than about 0.925 g/cm$^3$.

In one aspect, the shutdown reducing additive can be a metallocene linear low density polyethylene. Metallocene linear low density polyethylene is typically tougher than linear low density polyethylene and can have a density of between about 0.915 g/cm$^3$ and about 0.94 g/cm$^3$. The polymer is made using a metallocene catalyst. Metallocene linear low density polyethylene can be a copolymer of ethylene with butene or hexene. The metallocene linear low density polyethylene can have a molecular weight distribution or a polydispersity index of less than about 3.5, such as less than about 3, such as less than about 2.5.

The shutdown reducing additive can also be comprised of polyethylene wax particles. A polyethylene wax generally has a vary low molecular weight. For instance, the average molecular weight can be less than about 12,000 g/mol, such as less than about 8,000 g/mol, such as less than about 6,000 g/mol, such as less than about 4,000 g/mol, such as less than about 2,000 g/mol. The number average molecular weight is generally greater than about 200 g/mol, such as greater than about 400 g/mol. Polyethylene waxes are typically polyethylene homopolymers although copolymers exist as well. Polyethylene wax can either be formed from a low density polyethylene or a high density polyethylene. In one aspect, the polyethylene wax can have a molecular weight distribution of from about 1.5 to 5, such as from about 1.5 to about 2.5.

When the shutdown reducing additive comprises a polyethylene polymer, the polymer can have a melt flow rate of generally from about 0.05 g/10 min to about 100 g/10 min (when measured at a load of 2.16 kg). For instance, the melt flow rate can be greater than about 0.1 g/10 min, such as greater than about 0.8 g/10 min, such as greater than about 1 g/10 min, such as greater than about 1.5 g/10 min, such as greater than about 3 g/10 min, such as greater than about 5 g/10 min, such as greater than about 10 g/10 min, such as greater than about 20 g/10 min. The melt flow rate is generally less than about 70 g/10 min, such as less than about 50 g/10 min, such as less than about 30 g/10 min, such as less than about 20 g/10 min. The melt flow rate, in one aspect, can be relatively low and can be less than about 10 g/10 min, such as less than about 8 g/10 min, such as less than about 6 g/10 min, such as less than about 4 g/10 min, such as less than about 3 g/10 min, such as less than about 2 g/10 min.

When the shutdown reducing additive comprises a polyethylene polymer, the polyethylene polymer can be in the form of particles. The particles can have an average d50 particle size of generally greater than about 100 microns, such as greater than about 200 microns, such as greater than about 250 microns, such as greater than about 300 microns, and generally less than about 1,000 microns, such as less than about 900 microns, such as less than about 800 microns, such as less than about 600 microns, such as less than about 500 microns. The density of the polyethylene polymer can generally be anywhere from about 0.91 g/cm$^3$ to about 0.95 g/cm$^3$ including all increments of 0.01 g/cm$^3$ therebetween.

In addition to various polyethylene polymers, the shutdown reducing additive can also comprise a fatty acid derivative, such as a hydrogenated fatty acid or a dimer of a fatty acid. Hydrogenated fatty acids are fatty acids where the majority of double bonds have been converted to single bonds. The hydrogenated fatty acid can be formed from a fatty acid having a carbon chain length of greater than about 12 carbon atoms, such as greater than about 16 carbon atoms, such as greater than about 18 carbon atoms, such as greater than about 20 carbon atoms, such as greater than about 24 carbon atoms, and generally less than about 52 carbon atoms, such as less than about 48 carbon atoms, such as less than about 38 carbon atoms.

Dimers of fatty acids or dimerized fatty acids are prepared by dimerizing unsaturated fatty acids obtained from tall oil. A dimerized fatty acid can be formed from a fatty acid having a carbon chain length as described above with respect to hydrogenated fatty acids.

In still another embodiment, the shutdown reducing additive can comprise elastomer particles. Thermoplastic elastomers include styrenic block copolymers, olefin elastomers, polyester elastomers, polyamide elastomers, and polyurethane elastomers. Styrenic block copolymers include styrene-ethylene-ethylene-propylene-styrene polymers, styrene-ethylene-butylene-styrene polymers, and styrene-butadiene-styrene polymers.

In one aspect, the elastomer particles are made from a polyurethane elastomer. The thermoplastic polyurethane elastomer, for instance, may have a soft segment of a long-chain diol and a hard segment derived from a diisocyanate and a chain extender. In one embodiment, the polyurethane elastomer is a polyester type prepared by reacting a long-chain diol with a diisocyanate to produce a polyurethane prepolymer having isocyanate end groups, followed by chain extension of the prepolymer with a diol chain extender. Representative long-chain diols are polyester diols such as polybutylene adipate)diol, polyethylene adipate)diol and poly(s-caprolactone)diol; and polyether diols such as poly(tetramethylene ether)glycol, polypropylene oxide)glycol and polyethylene oxide)glycol. Suitable diisocyanates include 4,4'-methylenebis(phenyl isocyanate), 2,4-toluene diisocyanate, 1,6-hexamethylene diisocyanate and 4,4'-methylenebis-(cycloxylisocyanate). Suitable chain extenders are C2-C6 aliphatic diols such as ethylene glycol, 1,4-butanediol, 1,6-hexanediol and neopentyl glycol. One example of a thermoplastic polyurethane is characterized as essentially poly(adipic acid-co-butylene glycol-co-diphenylmethane diisocyanate).

The elastomer particles can also be made from a copolyester elastomer. In one embodiment, the copolyester elastomer can include ester and ether bonds. For example, the copolyester elastomer can have an alternating structure defined by a multiplicity of randomly recurring long-chain ester units and short-chain ester units, joined together by head-to-tail chaining through ester bonds.

The long-chain ester units are represented by the formula:

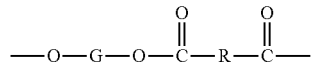

while the short-chain ester units are represented by the formula:

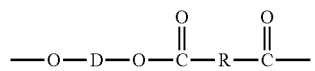

where:
G is a divalent group that remains after removal of terminal hydroxyl groups from a polyol having a molecular weight between about 250 and 6000;
R is a divalent group that remains after removal of carboxyl groups from a dicarboxylic acid having a molecular weight less than about 300;
D is a divalent group remaining after removal of hydroxyl groups from a diol having a molecular weight less than about 250.

In the case of groups G and D, the expression "divalent group" means a group having two hydroxyl reactive centres positioned one at the head and one at the tail to the molecule. In the case of group R, the expression "divalent group" means a group having two carboxyl reactive centres positioned one at the head and one in the tail to the molecule.

Structurally, the R groups are the groups that provide the polyester bond. In particular, when the R groups have an aromatic part, they confer crystallinity to the copolyester.

The G groups in combination with the R groups confer the elastomer properties to the copolyester.

The D groups in combination with the R groups confer properties of rigidity to the copolyester.

The above alternating structure can comprise from 5% to 15% by weight of short-chain ester units and from 70% to 80% by weight of long-chain ester units.

In one embodiment, the alternating structure thermoplastic copolyester elastomer can be obtained according to the following general reaction scheme:
esterification/transesterification of one or more dicarboxylic acids, of one or more esters of dicarboxylic acids and/or of one or more dimer or trimer carboxylic acids with diols and with diol polyglycols.
subsequent polycondensation of the products of esterification/transesterification.

The molecular weight of the copolyester elastomer can vary depending upon the particular application. In one embodiment, for instance, the molecular weight of the copolyester elastomer is greater than about 20,000 g/mol, such as greater than about 25,000 g/mol, such as greater than about 28,000 g/mol, such as greater than about 30,000 g/mol, such as greater than about 35,000 g/mol, such as greater than about 40,000 g/mol, such as greater than about 45,000 g/mol, such as greater than about 50,000 g/mol. The molecular weight of the polyester elastomer is generally less than about 200,000 g/mol, such as less than about 100,000 g/mol.

In still another aspect, the shutdown reducing additive can be a plastomer. A plastomer is a polymer material which combines the qualities of elastomers and thermoplastics. In one aspect, a polyolefin plastomer is used that comprises an alpha olefin copolymer, particularly an alpha olefin polyethylene copolymer. Suitable alpha-olefins may be linear or branched (e.g., one or more C1-C3 alkyl branches, or an aryl group). Specific examples include ethylene, 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Particularly desired alpha-olefin comonomers are ethylene, 1-butene, 1-hexene and 1-octene. The ethylene content of such copolymers may be from about 60 mole % to about 99.5 wt. %, in some embodiments from about 80 mole % to about 99 mole %, and in some embodiments, from about 85 mole % to about 98 mole %. The alpha-olefin content may likewise range from about 0.5 mole % to about 40 mole %, in some embodiments from about 1 mole % to about 20 mole %, and in some embodiments, from about 2 mole % to about 15 mole %. The distribution of the alpha-olefin comonomer is typically random and uniform among the differing molecular weight fractions forming the ethylene copolymer.

The density of the plastomer may generally be less than about 0.95 g/cc, such as less than about 0.91 g/cc. The density of the polyolefin is generally greater than about 0.8 g/cc, such as greater than about 0.85 g/cc, such as greater than about 0.88 g/cc. In one aspect, the plastomer can have a glass transition temperature of less than about 35° C., such as less than about 25° C.

As described above, the shutdown reducing additive is in the form of particles that are combined with the high density polyethylene particles. In general, the shutdown reducing additive particles have a median particle size by volume of less than about 800 microns, such as less than about 600 microns, such as less than about 400 microns, such as less than about 200 microns. The median particle size of the shutdown reducing additive is generally greater than about 10 microns, such as greater than about 20 microns, such as greater than about 50 microns, such as greater than about 70 microns. In one embodiment, the shutdown reducing additive particles can be selected, ground or milled so that the particle size substantially matches the particle size of the high density polyethylene particles. For instance, the median particle size of the shutdown reducing additive can be within about 20% (+or −) such as within about 10% of the median particle size of the high density polyethylene particle.

The shutdown reducing additive generally has a melt flow rate of from about 0.01 g/10 mins to about 110 g/10 mins, such as from about 0.03 g/10 mins to about 70 g/10 mins, such as from about 0.05 g/10 min to about 50 g/10 min. Melt flow rate can be measured using ISO Test 1133 at a temperature of 190° C. and at a load of 2.16 kg. More particularly, the melt flow rate of the shut reducing additive can be greater than about 2 g/10 min, such as greater than about 7 g/10 min, such as greater than about 10 g/10 min, and generally less than about 60 g/10 min, such as less than about 40 g/10 min, such as less than about 30 g/10 min, such as less than about 25 g/10 min, such as less than about 20 g/10 min.

In one aspect, the shutdown reducing additive (any of the shutdown reducing additives identified above) can have a melting point of generally less than about 130° C., such as less than about 129° C., such as less than about 128° C. The melting point is generally greater than about 105° C., such as greater than about 115° C.

The shutdown reducing additive is generally present in the polymer composition in conjunction with the high density polyethylene particles and the plasticizer in an amount from 2% by weight to about 40% by weight. For example, the shutdown reducing additive can be present in the polymer composition in an amount greater than about 2% by weight, such as in an amount greater than about 4% by weight, such as in an amount greater than about 8% by weight, such as in an amount greater than about 10% by weight, such as in an amount greater than about 12% by weight, such as in an amount greater than about 15% by weight, such as in an amount greater than about 18% by weight, such as in an amount greater than about 20% by weight, such as in an amount greater than about 22% by weight, and generally less than about than 40% by weight, such as in an amount less than about 35% by weight, such as in an amount less than about 30% by weight, such an in an amount less than about 20% by weight, such as in an amount less than about 15% by weight.

Once an article is formed from the polymer composition through gel extrusion, as described above, most if not all of the plasticizer can be removed. Thus, the shutdown reducing additive can be present in the final product, such as a porous membrane, in an amount greater than about 3% by weight, such as in an amount greater than about 5% by weight, such as in an amount greater than about 7% by weight, such as in an amount greater than about 8% by weight, such as in an amount greater than about 10% by weight, such as in an amount greater than about 12% by weight, and generally less than about 30% by weight, such as in an amount less than about 25% by weight, such as in an amount less than about 20% by weight, such as in an amount less than about 15% by weight, such as in an amount less than about 10% by weight.

The effect the shutdown reducing additive has on the shutdown temperature of polymer articles made from the polymer composition can depend upon various factors. In general, one or more shutdown reducing additives are incorporated into the polymer composition such that the shutdown temperature of the polymer composition is reduced by at least 1.8° C., such as at least 2.2° C., such as at least 2.5° C., such as at least 2.8° C., such as at least 3° C., such as at least 3.3° C., such as at least 3.5° C., such as at least 3.8° C., such as at least 4° C. in comparison to articles made from the polymer composition where the shutdown reducing additive is replaced by further amounts of the high density polyethylene particles. In one aspect, the shutdown temperature of the polymer composition is reduced by at least 5° C., such as at least 6° C., such as at least 7° C.

The amount the shutdown temperature is reduced through use of the additive is somewhat more important than the final or ultimate shutdown temperature of the polymer composition. For example, the additive of the present disclosure allows for the use of polyethylene polymers having higher shutdown temperatures and greater performance. The additive of the present disclosure, for instance, can be combined with these polymers for keeping the shutdown temperature within levels used in the past through the use of polyethylene polymers having inferior properties. In general, however, the shutdown temperature of articles made from the polymer composition can be at a temperature of 133.7° C. or less, such as 133.4° C. or less, such as 132.9° C. or less, such as 132.5° C. or less, such as 132.3° C. or less, such as 132° C. or less, such as 131.7° C. or less, such as 131.5° C. or less, such as 131.3° C. or less, such as 131° C. or less. The shutdown temperature, for instance, can be 130° C. or less, such as 129° C. or less. The shutdown temperature is generally greater than about 120° C., such as greater than about 125° C. The above shutdown temperatures are based upon measurements of the polymer article using the Impedance Test.

In addition to the high density polyethylene particles and the at least one shut down reducing additive, the polymer composition further contains a plasticizer. In general, any suitable plasticizer can be combined with the other components as long as the plasticizer is capable of forming a gel-like material suitable for gel spinning or extruding.

The plasticizer, for instance, may comprise a hydrocarbon oil, an alcohol, an ether, an ester such as a diester, or mixtures thereof. For instance, suitable plasticizers include mineral oil, a paraffinic oil, decaline, and the like. Other plasticizers include xylene, dioctyl phthalate, dibutyl phthalate, stearyl alcohol, oleyl alcohol, decyl alcohol, nonyl alcohol, diphenyl ether, n-decane, n-dodecane, octane, nonane, kerosene, toluene, naphthalene, tetraline, and the like. In one embodiment, the plasticizer may comprise a halogenated hydrocarbon, such as monochlorobenzene. Cycloalkanes and cycloalkenes may also be used, such as camphene, methane, dipentene, methylcyclopentandiene, tricyclodecane, 1,2,4,5-tetramethyl-1,4-cyclohexadiene, and the like. The plasticizer may comprise mixtures and combinations of any of the above as well.

The plasticizer is generally present in the composition used to form the polymer articles in an amount greater than about 50% by weight, such as in an amount greater than about 55% by weight, such as in an amount greater than about 60% by weight, such as in an amount greater than about 65% by weight, such as in an amount greater than about 70% by weight, such as in an amount greater than about 75% by weight, such as in an amount greater than about 80% by weight, such as in an amount greater than about 85% by weight, such as in an amount greater than about 90% by weight, such as in an amount greater than about 95% by weight, such as in an amount greater than about 98% by weight. In fact, the plasticizer can be present in an amount up to about 99.5% by weight.

The high density polyethylene particles and shutdown reducing additive blend with the plasticizer to form a homogeneous gel-like material.

In order to form polymer articles in accordance with the present disclosure, the high density polyethylene particles are combined with the shutdown reducing additive and the plasticizer and extruded through a die of a desired shape. In one embodiment, the composition can be heated within the extruder. For example, the plasticizer can be combined with the particle mixture and fed into an extruder. In accordance with the present disclosure, the plasticizer and particle mixture form a homogeneous gel-like material prior to leaving the extruder for forming polymer articles with little to no impurities.

In one embodiment, elongated articles are formed during the gel spinning or extruding process. The polymer article, for instance, may be in the form of a fiber or a film, such as a membrane.

During the process, at least a portion of the plasticizer is removed from the final product. The plasticizer removal process may occur due to evaporation when a relatively volatile plasticizer is used. Otherwise, an extraction liquid can be used to remove the plasticizer. The extraction liquid may comprise, for instance, a hydrocarbon solvent. One example of the extraction liquid, for instance, is dichloromethane. Other extraction liquids include acetone, chloroform, an alkane, hexene, heptene, an alcohol, or mixtures thereof.

If desired, the resulting polymer article can be stretched at an elevated temperature below the melting point of the polymer mixture to increase strength and modulus. Suitable temperatures for stretching are in the range of from about ambient temperature to about 155° C. The draw ratios can generally be greater than about 4, such as greater than about 6, such as greater than about 8, such as greater than about 10, such as greater than about 15, such as greater than about 20, such as greater than about 25, such as greater than about 30. In certain embodiments, the draw ratio can be greater than about 50, such as greater than about 100, such as greater than about 110, such as greater than about 120, such as greater than about 130, such as greater than about 140, such as greater than about 150. Draw ratios are generally less than about 1,000, such as less than about 800, such as less than about 600, such as less than about 400. In one embodiment, lower draw ratios are used such as from about 4 to about 10. The polymer article can be uniaxially stretched or biaxially stretched.

Polymer articles made in accordance with the present disclosure have numerous uses and applications. For example, in one embodiment, the process is used to produce a membrane. The membrane can be used, for instance, as a battery separator. Alternatively, the membrane can be used as a microfilter. When producing fibers, the fibers can be used to produce nonwoven fabrics, ropes, nets, and the like. In one embodiment, the fibers can be used as a filler material in ballistic apparel.

Figure 2:
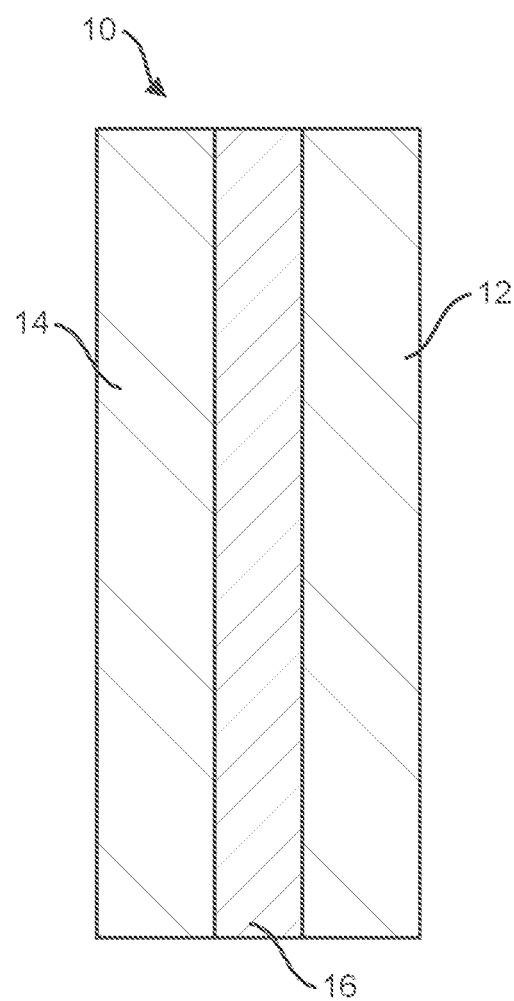
FIG. 2 is a cross-sectional view of an electronic device, such as a battery, incorporating a porous membrane made in accordance with the present disclosure.

Referring to FIG. 2, one embodiment of a lithium ion battery 10 made in accordance with the present disclosure is shown. The battery 10 includes an anode 12 and a cathode 14. The anode 12, for instance, can be made from a lithium metal. The cathode 14, on the other hand, can be made from sulfur or from an intercalated lithium metal oxide. In accordance with the present disclosure, the battery 10 further includes a porous membrane 16 or separator that is positioned inbetween the anode 12 and the cathode 14. The porous membrane 16 minimizes electrical shorts between the two electrodes while allowing the passage of ions, such as lithium ions. As shown in FIG. 2, in one embodiment, the porous membrane 16 is a single layer polymer membrane and does not include a multilayer structure. In one aspect, the single layer polymer membrane may also include a coating. The coating can be an inorganic coating made from, for instance, aluminum oxide or a titanium oxide. Alternatively, the single layer polymer membrane may also include a polymeric coating. The coating can provide increased thermal resistance.

The polymer composition and polymer articles made in accordance with the present disclosure may contain various other additives, such as heat stabilizers, light stabilizers, UV absorbers, acid scavengers, flame retardants, lubricants, colorants, and the like.

In one embodiment, a heat stabilizer may be present in the composition. The heat stabilizer may include, but is not limited to, phosphites, aminic antioxidants, phenolic antioxidants, or any combination thereof.

In one embodiment, an antioxidant may be present in the composition. The antioxidant may include, but is not limited to, secondary aromatic amines, benzofuranones, sterically hindered phenols, or any combination thereof.

In one embodiment, a light stabilizer may be present in the composition. The light stabilizer may include, but is not limited to, 2-(2'-hydroxyphenyl)-benzotriazoles, 2-hydroxy-4-alkoxybenzophenones, nickel containing light stabilizers, 3,5-di-tert-butyl-4-hydroxbenzoates, sterically hindered amines (HALS), or any combination thereof.

In one embodiment, a UV absorber may be present in the composition in lieu of or in addition to the light stabilizer. The UV absorber may include, but is not limited to, a benzotriazole, a benzoate, or a combination thereof, or any combination thereof.

In one embodiment, a halogenated flame retardant may be present in the composition. The halogenated flame retardant may include, but is not limited to, tetrabromobisphenol A (TBBA), tetrabromophthalic acid anhydride, dedecachloropentacyclooctadecadiene (dechlorane), hexabromocyclodedecane, chlorinated paraffins, or any combination thereof.

In one embodiment, a non-halogenated flame retardant may be present in the composition. The non-halogenated flame retardant may include, but is not limited to, resorcinol diphosphoric acid tetraphenyl ester (RDP), ammonium polyphosphate (APP), phosphine acid derivatives, triaryl phosphates, trichloropropylphosphate (TCPP), magnesium hydroxide, aluminum trihydroxide, antimony trioxide.

In one embodiment, a lubricant may be present in the composition. The lubricant may include, but is not limited to, silicone oil, waxes, molybdenum disulfide, or any combination thereof.

In one embodiment, a colorant may be present in the composition. The colorant may include, but is not limited to, inorganic and organic based color pigments.

In one aspect, an acid scavenger may be present in the polymer composition. The acid scavenger, for instance, may comprise an alkali metal salt or an alkaline earth metal salt. The salt can comprise a salt of a fatty acid, such as a stearate. Other acid scavengers include carbonates, oxides, or hydroxides. Particular acid scavengers that may be incorporated into the polymer composition include a metal stearate, such as calcium stearate. Still other acid scavengers include zinc oxide, calcium carbonate, magnesium oxide, and mixtures thereof.

These additives may be used singly or in any combination thereof. In general, each additive may be present in the polymer composition or in the resulting polymer article in an amount of at least about 0.05 wt. %, such as in an amount of at least about 0.1 wt. %, such as at least about 0.25 wt. %, such as at least about 0.5 wt. %, such as at least about 1 wt. % and generally less than about 20 wt. %, such as less than about 10 wt. %, such as less than about 5 wt. %, such as less than about 4 wt. %, such as less than about 2 wt. %. The sum of the wt. % of all of the components, including any additives if present, utilized in the polymer composition and articles will be 100 wt. %.

down reducing additives. The additives were blended with high density polyethylene of two different molecular weights in various weight ratios using a tumble blender. The resin compositions were prepared into membranes via gel extrusion, biaxial stretching, and solvent extraction as are conventional.

In the present example, the shutdown reducing additives used were low density polyethylene (LDPE) and linear low density polyethylene (LLDPE). In still other examples, the shutdown reducing additive was a plastomer. The plastomer was an alpha-olefin random copolymer. More specifically, the plastomer used was an octene-ethylene random copolymer. Shutdown temperatures of the modified compositions containing additives were compared with the shutdown temperatures of unmodified resins in which no additives were used. The shutdown temperatures of the resulting membranes were determined using three independent methods: directly by impedance spectroscopy, indirectly via softening point by dynamic thermomechanical analysis (TMA), and indirectly via melting point by differential scanning calorimetry (DSC). All tests were performed on stretched membranes.

In the sample compositions below, the plasticizer was present in an amount of 70% by weight and was almost completely removed in forming the membranes. The amount of the shutdown reducing additive in the composition that was extruded and in the final product is indicated in the table below. The high density polyethylene polymer made up the rest of the composition and membrane. The following results were obtained.

| Ex. | Base Resin MW (g/mol) | Additive | Loading (wt %) | Loading during extrusion (wt %) | SD (° C.) (Impedance) | SD (° C.) (TMA) | SD (° C.) (DSC) | SD drop compared to Ref (° C.) (Impedance) | SD drop compared to Ref (° C.) (TMA) | SD drop compared to Ref (° C.) (DSC) |
|---|---|---|---|---|---|---|---|---|---|---|
| 1 | 700k | None | 0 | 0 | 135.7 | 141.0 | 134.5 | Ref | Ref | Ref |
| 2 | 1.7M | None | 0 | 0 | 139.0 | 143.8 | 136.2 | Ref | Ref | Ref |
| 3 | 700k | LLDPE MFR 20 | 10 | 3 | 134.3 | 139.3 | 132.7 | 1.4 | 1.7 | 1.8 |
| 4 | 1.7M | LLDPE MFR 20 | 5 | 1.5 | N.A. | 141.9 | 134.4 | N.A. | 1.9 | 1.7 |
| 5 | 1.7M | LLDPE MFR 20 | 10 | 3 | N.A. | 140.5 | 134.8 | N.A. | 3.2 | 1.4 |
| 6 | 1.7M | LLDPE MFR 20 | 15 | 4.5 | N.A. | 140.2 | 133.7 | N.A. | 3.6 | 2.5 |
| 7 | 1.7M | LLDPE MFR 20 | 20 | 6 | 131.8 | 138.9 | 133.9 | 7.2 | 4.9 | 2.3 |
| 8 | 1.7M | LDPE MFR 8 | 5 | 1.5 | N.A. | 142.1 | 136.1 | N.A. | 1.7 | 0.1 |
| 9 | 1.7M | LDPE MFR 8 | 10 | 3 | N.A. | 140.4 | 135.9 | N.A. | 3.4 | 0.2 |
| 10 | 1.7M | LDPE MFR 8 | 15 | 4.5 | N.A. | 140.6 | 137.0 | N.A. | 3.2 | −0.8 |
| 11 | 1.7M | LDPE MFR 8 | 20 | 6 | N.A. | 140.2 | 133.1 | N.A. | 3.6 | 3.0 |
| 12 | 1.7M | Plastomer MFR 10 | 15 | 4.5 | N.A. | 141.3 | N.A. | N.A. | 2.5 | N.A. |
| 13 | 1.7M | Plastomer MFR 10 | 20 | 6 | 135.9 | 140.1 | N.A. | N.A. | 3.7 | N.A. |
| 14 | 1.7M | Plastomer MFR 10 | 25 | 7.5 | N.A. | 137.7 | N.A. | N.A. | 6.1 | N.A. |
| 15 | 1.7M | Plastomer MFR 10 | 30 | 9 | N.A. | 137.3 | N.A. | N.A. | 6.5 | N.A. |
| 16 | 1.7M | Plastomer MFR 10 | 40 | 12 | N.A. | 135.8 | N.A. | N.A. | 8 | N.A. |

SD = Shutdown Temperature

The present disclosure may be better understood with reference to the following example. The following example is given below by way of illustration and not by way of limitation. The following experiments were conducted in order to show some of the benefits and advantages of the present invention.

Example 1

The following example was conducted to demonstrate that resins made in accordance with the present disclosure yield membranes with lower shutdown (SD) temperatures compared to those of unmodified resins.

Various resin compositions were formulated containing a base resin of high density polyethylene with various shut- FIG. 1 is a graphical representation of the Impedance Test carried out on Example No. 1 and Example No. 3. As shown, Example No. 3 containing the linear low density polyethylene dramatically decreased the shutdown temperature. The shutdown temperature was decreased without effecting other properties of the porous membrane.

Example 2

The procedures of Example 1 were repeated using various different shut down reducing additives in different amounts. All of the shutdown reducing additives were polyethylene polymers such as linear low density polyethylene polymers, high density polyethylene polymers, and low density polyethylene polymers. More particularly, the different samples included the following shut down reducing additives:

| Sample No. | Type | MFR 2.16 kg (g/10 min) | MFR 5 kg (g/10 min) | 2nd melting point (° C.) | Particle Size d50 (microns) | Density (g/cm$^3$) |
|---|---|---|---|---|---|---|
| 18, 19 | LLDPE | 19.8 | 55.83 | 122.0 | 586 | 0.925 |
| 20, 21 | LLDPE | 5.7 | 15.9 | 124.6 | 800 | 0.933 |
| 22, 23 | HDPE | 0.6 | 2.0 | 131.0 | 262 | 0.943 |
| 24, 25 | LLDPE | not measurable | 47.6 | 121.7 | 790 | 0.928 |
| 26, 27 | HDPE | not measurable | 0.4 | 130.8 | 865 | 0.944 |
| 28, 29 | HDPE | 3.6 | 10.0 | 128.0 | 652 | 0.944 |
| 30, 31 | LDPE | 61.3 | 192.5 | 103.8 | 416 | 0.917 |
| 32, 33 | LLDPE | 20.2 | 55.1 | 120.9 | 616 | 0.924 |
| 34, 35 | LDPE | 1.9 | 7.8 | 107.2 | 404 | 0.918 |
| 36, 37 | LLDPE | 50.0 | NA | 122.0 | 560 | 0.926 |

Sample Nos. 38 and 39: Combination of Sample No. 22 and Sample No. 28 in a 50:50 weight ratio.

Sample Nos. 40 and 41: Combination of Sample No. 30 and Sample No. 34 in a 50:50 weight ratio.

The above shut down reducing additives were combined with a base polyethylene resin having a molecular weight of 1,700,000 g/mol following the procedures described in Example 1. Membranes were formed and various properties were measured. The following results were obtained:

| Sample # | Type of additive | Loading (wt %) | Effective loading during extrusion (30% solid content)(%) | Permeability (sec/100 ml) | Porosity (%) | Tensile MD (MPa) | Tensile TD (MPa) | Elongation MD (%) | Elongation TD (%) | Puncture (mN/μm) | SD (impedance) (° C.) | SD Drop (impedance) (° C.) |
|---|---|---|---|---|---|---|---|---|---|---|---|---|
| 17 | none | 0 | 0 | 507 | 44 | 220 | 99 | 23 | 98 | 1256 | 143.5 | 0.0 |
| 18 | LLDPE | 15 | 4.5 | 306 | 43 | 170 | 128 | 55 | 131 | 1101 | 139.1 | 4.4 |
| 19 | LLDPE | 25 | 7.5 | 385 | 31 | 194 | 144 | 45 | 121 | 1316 | 137.0 | 6.5 |
| 20 | LLDPE | 15 | 4.5 | 440 | 33 | 204 | 150 | 46 | 102 | 1161 | 139.5 | 4.0 |
| 21 | LLDPE | 25 | 7.5 | 295 | 32 | 180 | 139 | 51 | 110 | 1247 | 133.8 | 9.7 |
| 22 | HDPE | 15 | 4.5 | 402 | 38 | 203 | 114 | 37 | 99 | 1105 | 139.6 | 3.9 |
| 23 | HDPE | 25 | 7.5 | 566 | 34 | 256 | 143 | 25 | 137 | 1200 | 140.4 | 3.1 |
| 24 | LLDPE | 15 | 4.5 | 481 | 32 | 272 | 142 | 31 | 124 | 1310 | 140.7 | 2.8 |
| 25 | LLDPE | 25 | 7.5 | 309 | 37 | 249 | 138 | 22 | 119 | 1160 | 136.1 | 7.4 |
| 26 | HDPE | 15 | 4.5 | 417 | 43 | 216 | 126 | 35 | 130 | 1195 | 141.3 | 2.2 |
| 27 | HDPE | 25 | 7.5 | 594 | 37 | 204 | 129 | 34 | 108 | 1124 | 137.6 | 5.9 |
| 28 | HDPE | 15 | 4.5 | 414 | 40 | 215 | 132 | 30 | 132 | 1094 | 140.3 | 3.2 |
| 29 | HDPE | 25 | 7.5 | 342 | 41 | 203 | 119 | 25 | 138 | 1002 | 137.8 | 5.7 |
| 30 | LDPE | 15 | 4.5 | 845 | 32 | 207 | 122 | 19 | 141 | 1184 | 137.9 | 5.6 |
| 31 | LDPE | 25 | 7.5 | 1230 | 27 | 254 | 127 | 18 | 121 | 1282 | 135.3 | 8.2 |
| 32 | LLDPE | 15 | 4.5 | 329 | 33 | 234 | 131 | 33 | 137 | 1421 | 138.6 | 4.9 |
| 33 | LLDPE | 25 | 7.5 | 397 | 32 | 229 | 140 | 27 | 137 | 1265 | 135.4 | 8.1 |
| 34 | LDPE | 15 | 4.5 | 609 | 39 | 249 | 124 | 24 | 106 | 1149 | 137.2 | 6.3 |
| 35 | LDPE | 25 | 7.5 | 606 | 27 | 242 | 125 | 17 | 130 | 1200 | 133.5 | 10.1 |
| 36 | LLDPE | 15 | 4.5 | 388 | 41 | 216 | 148 | 28 | 107 | 1154 | 139.1 | 4.4 |
| 37 | LLDPE | 25 | 7.5 | 480 | 38 | 240 | 131 | 21 | 98 | 1183 | 136.4 | 7.1 |
| 38 | HDPE | 15 | 4.5 | 344 | 45 | 236 | 109 | 32 | 51 | 991 | 140.1 | 3.4 |
| 39 | HDPE | 25 | 7.5 | 449 | 39 | 220 | 111 | 28 | 76 | 1078 | 139.5 | 4.0 |
| 40 | LDPE | 15 | 4.5 | 631 | 35 | 264 | 116 | 20 | 128 | 1175 | 137.1 | 6.4 |
| 41 | LDPE | 25 | 7.5 | 2040 | 22 | 245 | 140 | 26 | 91 | 1419 | 133.8 | 9.7 |

What is claimed:

1. A polymer composition for producing gel extruded articles comprising:
a plasticizer, the plasticizer being present in the polymer composition in an amount greater than about 50% by weight;
high density polyethylene particles, the high density polyethylene of the high density polyethylene particles having a density of 0.93 g/cm³ or greater and having a number average molecular weight of greater than about 500,000 g/mol;
a shutdown reducing additive, the shutdown reducing additive comprising particles that are combined with the high density polyethylene particles and the plasticizer, the shutdown reducing additive having an MFR of 0.1 g/10 min or more; and
wherein the polymer composition when formed into a membrane has a shutdown temperature that is at least 1.4° C. lower than a shutdown temperature of a polymer composition where the shutdown reducing additive is replaced by further amounts of the high density polyethylene particles.

2. A polymer composition as defined in claim 1, wherein the shutdown temperature is at least 2.5° C. lower than the shutdown temperature of a polymer composition where the shutdown reducing additive is replaced by further amounts of the high density polyethylene particles.

3. A polymer composition for producing gel extruded articles comprising:
a plasticizer, the plasticizer being present in the polymer composition in an amount greater than about 50% by weight;
high density polyethylene particles, the high density polyethylene of the high density polyethylene particles having a density of 0.93 g/cm³ or greater and having a number average molecular weight of greater than about 500,000 g/mol; and
a shutdown reducing additive, the shutdown reducing additive comprising particles that when combined with the high density polyethylene particles and the plasticizer reduces a shutdown temperature of a membrane made from the polymer composition, wherein the shutdown reducing additive comprises a second high density polyethylene, a low density polyethylene, a linear low density polyethylene, a metallocene catalyzed linear low density polyethylene, a medium density polyethylene, a polyethylene wax, a hydrogenated fatty acid, an amide of a fatty acid, a dimer of a fatty acid, a plastomer, an elastomer, or mixtures thereof, the shutdown reducing additive having an MFR of 0.1 g/10 min or more.

4. A polymer composition as defined in claim 3, wherein the shutdown reducing additive comprises a polyethylene polymer having the MFR of from 0.1 g/10 min to about 20 g/10 min.

5. A polymer composition as defined in claim 3, wherein the shutdown reducing additive is present in the polymer composition in an amount from about 0.5% to about 35% by weight.

6. A polymer composition as defined in claim 3, wherein the high density polyethylene particles have a median particle size by volume of less than about 150 microns and wherein the shutdown reducing additive has a median particle size by volume of less than about 800 microns.

7. A polymer composition as defined in claim 3, wherein the high density polyethylene particles are present in the composition in an amount less than 45% by weight.

8. A polymer composition as defined in claim 3, wherein the shutdown reducing additive has the melt flow rate of from about 0.8 g/10 min to about 70 g/10 min, wherein the shutdown reducing additive is present in the polymer composition in an amount from about 10% to about 40% by weight.

9. A polymer composition as defined in claim 3, wherein the plasticizer comprises mineral oil, a paraffinic oil, a hydrocarbon, an alcohol, an ether, an ester, or mixtures thereof.

10. A polymer composition as defined in claim 3, wherein the plasticizer comprises decaline, paraffin oil, white oil, mineral oil, xylene, dioctyl phthalate, dibutyl phthalate, stearyl alcohol, oleyl alcohol, decyl alcohol, nonyl alcohol, diphenyl ether, n-decane, n-dodecane, octane, nonane, kerosene, toluene, naphthalene, tetraline, monochlorobenzene, camphene, methane, dipentene, methylcyclopentandiene, tricyclodecane, 1,2,4,5-tetramethyl-1,4-cyclohexadiene, or mixtures thereof.

11. A process for producing polymer articles comprising:
forming the polymer composition as defined in claim 3 into a gel-like composition;
extruding the gel-like composition through a die to form a polymer article, the polymer article comprising a film.

12. A process as defined in claim 11, further comprising a step of removing at least part of the plasticizer from the polymer article.

13. A process as defined in claim 11, wherein an extraction solvent is added to the polymer composition during the process in order to facilitate removal of the plasticizer from the polymer article.

14. A process as defined in claim 13, wherein the extraction solvent comprises dichloromethane, acetone, chloroform, an alkane, hexene, heptene, an alcohol, or mixtures thereof.

15. A porous membrane comprising:
a high density polyethylene combined with a shutdown reducing additive, the high density polyethylene being present in the membrane in an amount of greater than about 70% by weight, the high density polyethylene having a density of 0.93 g/cm³ or greater and having a number average molecular weight of greater than about 500,000 g/mol, the shutdown reducing additive comprising a second high density polyethylene, a low density polyethylene, a medium density polyethylene, a linear low density polyethylene, a metallocene catalyzed linear low density polyethylene, a polyethylene wax, a hydrogenated fatty acid, an amide of a fatty acid, a dimer of a fatty acid, a plastomer, an elastomer, or mixtures thereof, the shutdown reducing additive being present in the porous membrane in an amount sufficient to reduce a shutdown temperature of the membrane by at least 2° C. when measured according to an Impedance Test, the shutdown reducing additive having an MFR of 0.1 g/10 min or more.

16. A porous membrane as defined in claim 15, wherein the shutdown reducing additive is present in the membrane in an amount from about 2% by weight to about 30% by weight.

17. A porous membrane as defined in claim 15, wherein the shutdown reducing additive comprises a plastomer, the plastomer comprising an octene and ethylene random copolymer.

18. A porous membrane as defined in claim 15, wherein the shutdown reducing additive comprises a linear low density polyethylene or a low density polyethylene.

19. A battery comprising an anode, a cathode, and a separator membrane positioned between the anode and the cathode, the separator membrane comprising the porous membrane as defined in claim 15.

20. A battery as defined in claim 19, wherein the separator membrane is a single layer polymer membrane that may optionally include a coating.

21. A battery as defined in claim 20, wherein the single layer polymer membrane includes a coating, the coating comprising an inorganic coating or a polymer coating.

* * * * *